United States Patent [19]
Carlin et al.

[11] 3,941,192
[45] Mar. 2, 1976

[54] METHOD FOR RECOVERING HIGH ASPHALTENE CONTENT PETROLEUM USING SURFACTANTS

[75] Inventors: Joseph T. Carlin; Ricardo L. Cardenas, both of Houston, Tex.

[73] Assignee: Texaco Inc., New York, N.Y.

[22] Filed: Aug. 26, 1974

[21] Appl. No.: 500,232

[52] U.S. Cl.............. 166/304; 166/274; 166/305 R
[51] Int. Cl.²..................... E21B 43/00; E21B 43/16
[58] Field of Search ........... 166/273, 274, 275, 304, 166/305 R; 252/8.55 D

[56] References Cited
UNITED STATES PATENTS

| | | | |
|---|---|---|---|
| 2,259,428 | 10/1941 | Shelley............................... | 166/304 |
| 2,262,428 | 11/1941 | Lietz............................... | 252/8.55 D |
| 2,970,958 | 2/1961 | Shapiro.............................. | 166/304 |
| 2,981,684 | 4/1961 | Barnes et al........................ | 166/304 |
| 3,016,352 | 1/1962 | Hessel............................... | 166/274 |
| 3,172,473 | 3/1965 | Crowley et al...................... | 166/304 |
| 3,398,094 | 8/1968 | Blatz et al.......................... | 166/275 |
| 3,414,054 | 12/1968 | Bernard............................. | 166/273 |
| 3,490,532 | 1/1970 | Carlin................................ | 166/274 |
| 3,670,819 | 6/1972 | Dauben et al...................... | 166/304 |
| 3,732,926 | 5/1973 | Brown et al........................ | 166/272 |

*Primary Examiner*—Frank L. Abbott
*Assistant Examiner*—Jack E. Ebel
*Attorney, Agent, or Firm*—T. H. Whaley; C. G. Ries; Jack H. Park

[57] ABSTRACT

Surfactant flooding is frequently ineffective for recovering highly asphaltic petroleum because the asphaltic constituents of the petroleum have a strong affinity for the mineral surfaces such as sand grains present in the subterranean formation, and so are inefficiently displaced by passage of a surfactant containing solution through the pore spaces of the formation. Surfactant flooding is effective for asphaltic crudes if an effective solvent for the asphaltic petroleum which has a moderate water solubility is included in the preflush solution which preceded the surfactant solution or in the surfactant solution itself. Effective materials include quinoline and crude coal tar bases which contain substantial amounts of quinoline.

12 Claims, 1 Drawing Figure

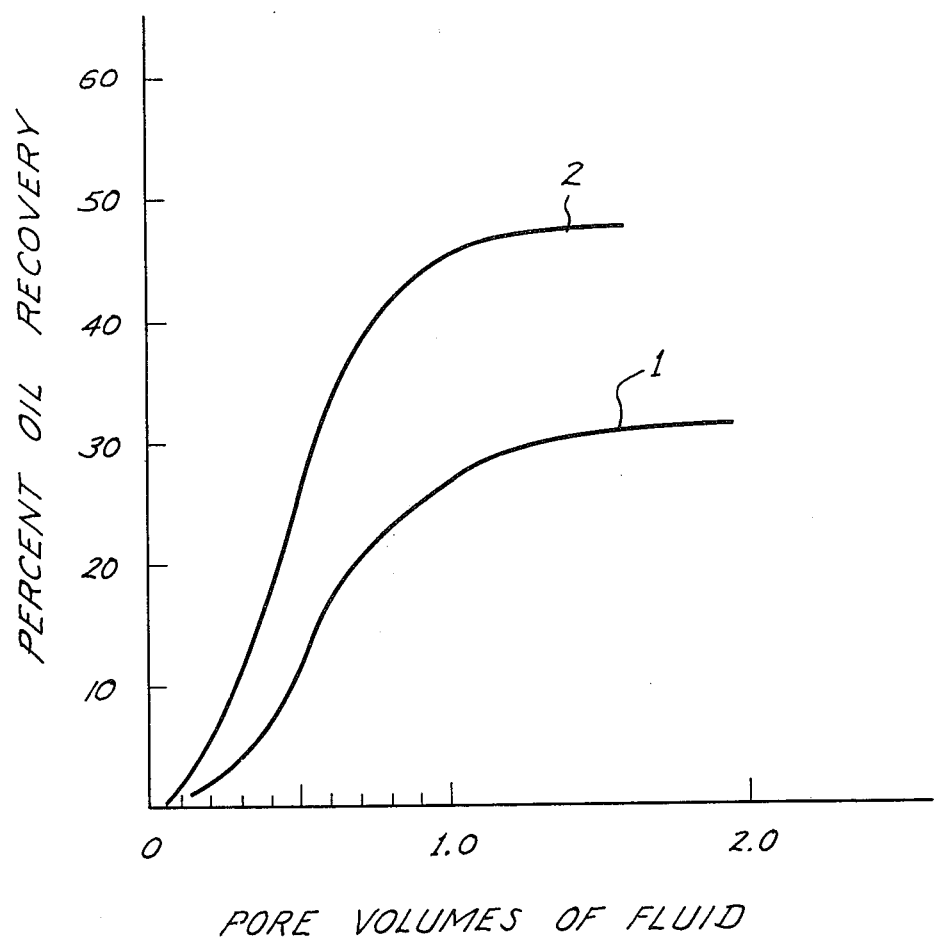

METHOD FOR RECOVERING HIGH ASPHALTENE CONTENT PETROLEUM USING SURFACTANTS

BACKGROUND OF THE INVENTION

Field of the Invention

This invention relates to a surfactant flooding method of recovering petroleum from subterranean petroleum containing formations. More particularly, this invention relates to a method for recovering high asphalt content petroleum which is otherwise not satisfactorily displaced by surfactant flooding, by incorporating a material in the surfactant preflush or surfactant solution which is moderately soluble in water and which is also an effective solvent for the asphaltic petroleum.

BACKGROUND AND PRIOR ART

Many subterranean, petroleum containing formations contain natural energy in the form of active bottom water drive, solution gas drive, or gas cap drive, in sufficient quantity to drive the petroleum to the production well from which it can be transported to the surface. This phase of oil recovery, known as primary recovery, recovers only a small portion of the petroleum originally in place. When the natural energy source has been depleted, or in those formations were insufficient natural energy was originally present to permit primary recovery, some form of supplemental treatment is required to recover additional petroleum from the formation. Water flooding is by far the most economical and widely practiced supplemental recovery procedure, and involves injecting water into the formation by one or more injection wells. The injected water displaces or moves the petroleum toward one or more production wells, where it is transported to the surface. Although considerable additional oil is recoverable by means of water flooding, usually about 50% or more of the oil originally in the formation remains in the formation after termination of conventional water flooding operations.

It is well known in the art of oil recovery that the inclusion of a surface active material or surfactant in the flood water will increase the recovery efficiency by a substantial amount. Many materials have been proposed for use in surfactant oil recovery processes. Petroleum sulfonate is a particularly popular material at the present time, although other surfactants, and combinations of surfactants are known to be very effective in special types of reservoirs for recovering petroleum.

Although surfactant flooding has been effective in some formations, there are many petroleum reservoirs known to exist which do not respond satisfactorily to surfactant flooding. Even formations having rock and formation waters similar to other formations in which surfactant flooding may be used satisfactorily are sometimes unresponsive to surfactant flooding. One common reason for failure of surfactant flooding to recover appreciable quantities of additional oil is the high asphalt content of the formation petroleum. When the formation petroleum contains large amounts of asphalt and/or asphaltenes, these materials adsorb on formation rock or sand surfaces and consequently make the formation surfaces oil wet, with the result that very little additional oil recovery is achieved.

The uses of quinoline and related compounds as an interfacial tension reducer in oil recovery processes other than surfactant flooding processes have been described in the prior art, particularly in U.S. Pats. 3,490,532 and 3,732,926. The same material is also disclosed in connection with the method of transporting viscous hydrocarbon in a pipeline in U.S. Pat. 3,490,471.

In view of the foregoing discussion, it can be appreciated that there is a substantial unfulfilled need for a surfactant oil recovery method applicable to formations containing petroleum having abnormally high contents of asphaltic materials or asphaltenes.

SUMMARY OF THE INVENTION

We have discovered that asphaltic petroleum may be recovered from a subterranean, asphaltic petroleum containing formation by contacting the formation with an aqueous solution of a material which is an effective solvent for the asphaltic material contained in the petroleum, and which is sparingly soluble in water. The substance may be incorporated in a preflush which is injected into the formation immediately in advance of the surfactant solution or the material may be dissolved in the same solution as contains the surfactant material. Suitable materials for use in the process of our invention include quinoline, and related materials generally known by persons skilled in the art as coal tar bases.

BRIEF DESCRIPTION OF THE DRAWING

The drawing illustrates the oil recovery resulting from a surfactant flood preceeded by a quinoline water preflush compared to an identical surfactant flood without the quinoline water preflush.

DETAILED DESCRIPTION OF THE INVENTION

Surprisingly, it has been discovered that the incorporation of a small amount of quinoline or coal tar bases which contain appreciable amounts of quinoline and other related materials in aqueous surfactant solution, or in an aqueous solution used as a preflush injected in advance of the surfactant flood, will substantially increase the effectiveness of the surfactant solution for recovering asphaltic petroleum from a subterranean formation. By asphaltic petroleum is meant for the purpose of this application, any crude petroleum containing at least 1.5% by weight pentane insoluble hydrocarbons.

A variety of materials may be employed in the method of this invention. It is essential that the material used be very soluble in the asphaltic petroleum and reduce the viscosity of the petroleum in which it is dissolved as a consequence of its presence therein. It is also essential that the materials have a limited solubility in water. Surprisingly, it has been found that for several reasons it is preferable that the material not be highly soluble in water. Ideally, the solubility of the material in water should be at least 0.05 percent by weight but not more than about five or ten percent by weight, as measured in distilled water at 75°F.

There are several reasons for the preferred limited solubility in water for the material to be used in the process of our invention. If the material is highly soluble in water and in asphaltic petroleum, where will be no great tendency for the material to partition from the aqueous solution to the asphaltic petroleum phase. By contrast, when a sparingly water soluble material which is very soluble in petroleum is used, there is a strong tendency for the material to partition from an aqueous solution into the asphaltic petroleum phase in the reservoir. There is another advantage to be used in the low water soluble compound. For economic reasons, it is generally necessary to use relatively low concentrations of any material injected into a subterranean reservoir, since large volumes are generally required. If a compound is used for which the optimum treating level from the economic point of view is about the same as the maximum solubility of the material, then a saturated solution may be used and the preferred concentration is easier to maintain since there is no way that a concentration higher than needed can be inadvertently injected.

The preferred material for use in the process of our invention is quinoline, whose structure is as follows:

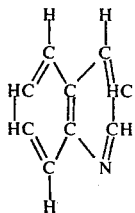

As can be seen from the above structure, quinoline is a benzopyridine formed by fusion of a pyridine ring and a benzene ring. These hetrocyclic chemicals are derived principally from coal tar. They are weakly alkaline, hydrophilic liquids having principally aromatic characteristics.

Coal tar, which is a by-product from the manufacture of illuminating gas and the preparation of coke for use in blast furnaces used in the smelting of iron, is usually divided by means of distillation into four fractions. These fractions are generally classified by persons skilled in the art as light oil, middle oil, heavy oil and green oil plus a pitch residue. The middle oil distillate contains naphthalein, phenol, cresol, pyridine and quinoline. The heavy oil fraction also contains some quinoline but most quinoline is obtained from the middle oil cut. While quinoline exhibits strongly aromatic characteristics, and exhibits the same reactions as do benzene and pyridine, it is unique in that it is sparingly soluble in water. Approximately 0.6 grams of quinoline will dissolve in 100 grams of water, whereas 0.003 grams of naphthalein will dissolve in 100 grams of water and 0.07 grams of benzene will dissolve in 100 grams of water. Thus, the water solubility and aromatic solvent characteristics of quinoline make it ideal for the process of our invention.

Although quinoline is the especially preferred species, a much less expensive, crude form may also be used. For example, quinoline residue as is suppled by Allied Chemicals, and which contains a high content of quinoline, substituted quinolines and isoquinoline, is quite satisfactory for use in our process.

The concentration quinoline or coal tar base containing quinoline used in the process of our invention may be varied over a reasonables range from about 0.2% by weight to an essentially saturated solution which will contain approximately 0.6% by weight. For economic and operational reasons, it is generally preferable to use a solution which is essentially saturated in quinoline, since this is a particularly convenient means of maintaining the quinoline concentration at a constant effective level during the course of operating according to the process of our invention.

The quinoline or other coal tar base containing solution may be injected into the formation as a preflush in advance of the surfactant solution. From about 5 to about 30 pore volume percent of the quinoline containing preflush solution should be injected into the formation immediately prior to the injection of the surfactant containing solution.

The quinoline or other coal tar base may be dissolved in essentially fresh water, or field water containing an appreciable amount of salt may also be used. Although the presence of sodium chloride in the preflush solution is not essential or necessarily beneficial to the functioning of the process of our invention, it is an advantage of our process that quinoline may be used in field waters containing an appreciable amount of salt, since these waters are frequently available for supplemental oil recovery purposes in more abundant supply and at lower cost than fresh water.

Other materials may also be added to the preflush, for the purposes of enhancing the effectiveness of the surfactant flooding process. For example, a sacrificial compound may be incorporated into the preflush which adsorbs on the formation surfaces and thereby prevents adsorption of surfactant or other chemicals employed in the process. For example, polyphosphates such as sodium tetrapyrophosphate may be dissolved in the water along with the quinoline for the purposes of decreasing the amount of surfactant or other chemicals adsorbed on the formation mineral surfaces. Other sacrificial materials used in preflushes for this purpose include sodium carbonate, sodium sulfate, sodium phosphate, water soluble flourides and certain quaternary ammonium salts.

The quinoline may be incorporated in the aqueous surfactant solution to form a novel composition which may be used in the process of our invention. The solution comprises an aqueous solution of surfactant plus from about 0.05 to about 10% of the solubilizing agent such as quinoline. The surfactant may be petroleum sulfonate, alkyl or alkylaryl surfonates, or multi-component surfactants such as a combination of an anionic and a nonionic surfactant. A specific embodiment comprises an aqueous solution containing 0.5% by weight petroleum sulfonate and 0.6% by weight quinoline (e.g. an essentially saturated solution of quinoline). Salts such as sodium chloride may also be included in the novel fluid. This fluid may be used in the same manner as a conventional surfactant containing fluid, with or without a preflush. One preferred method of accomplishing this is to prepare quinoline saturated water and dissolve the surfactant material to be used in the supplemental oil recovery operation in the quinoline saturated water. Although water which is less than fully saturated with quinoline may be used, it is particularly desirable to use an essentially saturated solution. The pore volumes of surfactant solution which additionally contain quinoline or other coal tar bases according to the process of our invention, is not materially different from the volume which would otherwise be required in surfactant flooding. Generally from about 5 to about 30 pore volume percent of surfactant solution is utilized in surfactant oil recovery operations, and this is a satisfactory volume for use in our process when a solution containing both surfactant and quinoline is injected.

The quinoline containing preflush or surfactant solution may be used in combination with any of the surfactants used for oil recovery operations. For example, quinoline may be used in combination with petroleum sulfonates as well as other anionic surfactants such as alkyl or alkylaryl sulfonates or phosphonate. Multiple component surfactant combinations are sometimes used in formations containing water having high concentrations of salt, or hard water which contains appreciable calcium or magnesium salts, or both. For example, a combination of an anionic surfactant such as an alkylaryl surfonate plus a nonionic surfactant such as a polyethoxylated alkyl phenol are quite effective in formations containing salty or hard water. The efficiency for recovering asphaltic petroleum using multi-component surfactant combinations such as these is increased by incorporation of quinoline or coal tar bases in the preflush or in the surfactant solution or both.

It should be realized that the solubility of quinoline is about 0.6% in tap water at about 75°F, but the solubility increases with temperature and decreases as the concentration of sodium chloride or other salts or solids dissolved in the solution increases. For example, the solubility of quinoline in distilled water at 75°F is 0.667% and at 300°F it is 13.37% by weight. In a formation whose temperature is substantially above 75°F, a solution which is saturated at surface ambient temperatures may be well below the saturation level at the temperature of the formation. In some applications this is not a consideration; however, one embodiment of our invention includes heating the quinoline solution to a temperature higher than ambient temperatures and preferably to a temperature at least as great as the temperature of the oil formation into which the solution is to be injected.

When it is desired to dissolve quinoline in salt containing water, the loss of quinoline solubility due to the salt may be offset by heating the solution to a temperature above surface ambient temperature prior to saturation of the solution with quinoline. The solution should not, of course, be allowed to cool appreciably prior to being injected into the formation.

Generally if it is necessary to heat the quinoline solution, it is satisfactory to heat the solution to a temperature between about 125°F and the formation temperature.

The following laboratory experiments further serve to illustrate the methods for utilizing the process of our invention. These examples are offered only for purposes of disclosure, however, and are not intended to be limitative or restrictive.

Two core displacement tests were performed in a Salem Benoist Core using Walpole formation injection water and Walpole crude oil, a highly asphaltic crude. In both runs, a conventional surfactant flood was performed comprising a 0.3 pore volume surfactant slug containing 24 kilograms per cubic meter of Witco TRS 10 B (active) petroleum sulfonate, 1.0 kilograms per cubic meter of sodium tetrapyrophosphate, 15 kilograms per cubic meter sodium chloride, and 0.5 kilograms per cubic meter Nalco polymer Q-41-F, a polyacrylamide in tap water. This was followed by a 0.7 pore volume slug containing 0.50 kilograms per cubic meter Nalco Polymer Q-41-F in tap water, followed by Walpole injection water to a final total injected fluid value of two pore volumes. Run 1 was performed using a preliminary waterflood with water containing 15 kilograms of soidum chloride per cubic meter of solution. The preflush slug for Run 2 comprised a 0.3 pore volume slug which contained the same amount of sodium chloride as in Run 1 but was formulated in quinoline saturated water. The results are shown in the attached drawing. As can be seen, Run 2, performed with a quinoline saturated water preflush recovered 48% of the oil originally present in the core, whereas Run 1 recovered only 31% of the oil. Thus the presence of quinoline in the preflush injected into the core in advance of the surfactant solution resulted in the recovery of 55% more oil than an otherwise identical surfactant flood using a preflush which contained no quinoline. It is especially surprising that only 0.6% by weight quinoline in the preflush would result in an increase in oil recovery of this magnitude.

Two linear cores obtained from wells in the Aux Vases formation in Hamilton county, Illinois were used in the next examples. The core properties are listed in Table I below.

TABLE I

| CORE PROPERTIES | Core A | Core B |
|---|---|---|
| Well depth, meters | 569 | 578 |
| Diameter of core, cm. | 5.08 | 5.08 |
| Core Length, cm. | 12.0 | 46.70 |
| Core Porosity, cm³/cm³ | 0.180 | 0.173 |
| Permeability, μm² | .026 | .182 |

Water from the same unit as contained in the wells from which the cores described above was obtained and analyzed, and found to contain the following dissolved solids: 35,791 milligrams per liter sodium, 6,713 milligrams per liter calcium, 912 milligrams per liter magnesium, 69,090 milligrams per liter chloride, 770 milligrams per liter sulfate, and 123 milligrams per liter bicarbonate.

Crude oil from the same unit was also used in the experiment. This oil is a 34° API oil containing 3.2% pentane insolubles (asphaltenes). The core was saturated with the above described crude and water flooded with the above described water until a high water cut was reached, after which a 0.2 pore volume preflush prepared by dissolving 1.3% sodium chloride in quinoline saturated fresh water was injected into the core. This was followed by a 0.85 pore volume slug containing the following materials prepared in fresh water: 3% TRS 10-80A, Witco Petroleum Sulfonate, 0.06% TRS 50, Witco Petroleum Sulfonate, 0.1% STP and 1.3% sodium chloride, and 500 milligrams per kilogram of Nalco polymer, a polyacrylamide. This was followed by a 1.25 pore volume slug containing 500 milligrams per kilogram Nalco polymer dissolved in fresh water as a controlled mobility displacing slug. A final recovery of approximately 88% and a final residual oil saturation of 6% were observed. This is by far the best recovery measured using this crude and core.

The above described results were obtained using Core A, the shorter of the two cores. An essentially identical experiment was performed using the longer core, Core B, with very similar results. The final oil recovery was 84.5% of the oil originally in place, and the oil saturation was reduced to approximately 9% of the pore volume.

Another experiment was performed using an Aux Vases core similar to those described above, and saturated with the same crude petroleum as was described above. The core was first flooded with a 10 pore volume percent preflush prepared in quinoline saturated fresh water and having 13 kilograms of sodium chloride per cubic meter. This was followed by a 35 pore volume percent surfactant slug containing 30 kilograms of TRS 10-80, a petroleum sulfonate per cubic meter of solution, 1.0 kilograms of STPP, sodium tetrapyrophosphate per cubic meter of solution, and 13 kilograms sodium chloride per cubic meter of solution. 0.5 kilograms of Nalco polymer solution was similarly dissolved in fresh water. This was followed by 65 pore volume percent solution containing .5 kilograms of Nalco polymer solution per cubic meter of fresh water, which was then followed by unit supply water to a high water cut. This experiment resulted in recovering slightly better than 70% of the oil originally in place, and reduced the residual oil saturation to 7% of the pore space. This is a very satisfactory response.

Thus we have disclosed and demonstrated in laboratory core displacement experiments that the inclusion of a small amount of a coal tar base such as quinoline or related compounds in the preflush solution will increase the effectiveness of a surfactant oil recovery process for recovering high asphalt content crudes. While our invention has been described in terms of a number of specific illustrated embodiments, it is not so limited since many variations thereof will be apparent to persons skilled in the related art without departing from the true spirit and scope of our invention. Similarly, while a mechanism has been disclosed to explain the benefits resulting from the use of the process of our invention, it is not necessarily represented that this is the only or even the principal explanation for the benefits to be achieved in the utilization of the process of our invention and we do not wish to be bound by any particular explanation of the operation of our process. It is out intention that our invention be limited and restricted only by those limitations and restrictions as appear in the claims appended hereinafter below.

We claim:

1. A method of recovering asphaltic petroleum from a subterranean formation wherein an aqueous surfactant solution is injected into the formation, the improvement for increasing the oil recovery efficiency which comprises,
    contacting the asphaltic petroleum prior to injecting the surfactant solution or simultaneously therewith with an aqueous solution containing a solvent for petroleum which has a solubility of from about 0.01 to about 10% by weight in fresh water at 75°F., and which has a solubility in the asphaltic petroleum substantially greater than the solubility in water.

2. A method as recited in claim 1 wherein the solvent is selected from the group consisting of coal tar bases, quinoline, isoquinoline, substituted quinoline, and mixtures thereof.

3. A method as recited in claim 2 wherein the solvent is quinoline.

4. A method as recited in claim 1 wherein the solution is essentially saturated with respect to the solvent.

5. A method as recited in claim 1 wherein the solvent is dissolved in a preflush solution and injected into the formation in advance of a surfactant solution.

6. A method as recited in claim 1 wherein the solvent is dissolved in the same solution as contains the surfactant.

7. A method as recited in claim 1 wherein the solvent is dissolved in an aqueous solution which also contains sodium chloride.

8. A method as recited in claim 1 wherein the solvent is dissolved in an aqueous solution which also contains a calcium salt dissolved therein.

9. A method as recited in claim 1 wherein aqueous solution is essentially saturated with quinoline.

10. A method as recited in claim 1 comprising the additional step of heating the aqueous solution to a temperature higher than surface ambient temperature prior to contacting the asphaltic petroleum with the aqueous solution.

11. A method as recited in claim 10 wherein the aqueous solution is heated to a temperature at least as great as the formation temperature.

12. A method as recited in claim 10 wherein the aqueous solution is saturated with respect to the solvent at the temperature higher than surface ambient temperature.

* * * * *